United States Patent [19]

Belansky

[11] 4,307,797
[45] Dec. 29, 1981

[54] CURVED TOOTH GEAR COUPLING

[75] Inventor: Rudolph J. Belansky, Elmhurst, Ill.

[73] Assignee: Illinois Tool Works Inc., Chicago, Ill.

[21] Appl. No.: 78,863

[22] Filed: Sep. 26, 1979

[51] Int. Cl.³ .............................................. F16D 11/00
[52] U.S. Cl. ..................... 192/108; 74/459.5
[58] Field of Search ..................... 192/46, 64, 66, 108, 192/67 R; 74/462, 322, 332, 459.5, 378, 385, 417, 424.5; 29/159.2; 72/39

[56] References Cited

U.S. PATENT DOCUMENTS

| | | | |
|---|---|---|---|
| 1,332,151 | 2/1920 | Wingquist | 74/459.5 |
| 1,748,813 | 2/1930 | Wildhaber | 74/459.5 |
| 2,311,006 | 2/1943 | Trbojevich | 74/459.5 |
| 2,696,125 | 7/1954 | Saari | 74/459.5 |
| 2,950,797 | 4/1956 | Zieher | 192/108 |
| 2,961,888 | 6/1958 | Wildhaber | 29/159.2 |
| 3,184,988 | 5/1965 | Osplack et al. | 74/462 |
| 3,735,849 | 5/1973 | Lutz | 192/108 |

FOREIGN PATENT DOCUMENTS 34372  6/1929  France ................................ 192/108

Primary Examiner—George H. Krizmanich
Attorney, Agent, or Firm—Thomas W. Buckman; Richard K. Thomson; Glenn W. Bowen

[57] ABSTRACT

A gear coupling in which the two halves have curved teeth and tooth patterns which mirror each other. Both the pressure angle and the spiral angle for any contact point on either the concave or convex side of the tooth on the first coupling half, is equal to the corresponding angle for the corresponding point on the convex or concave tooth of the second coupling half. The cross-sectional dimension of the tooth may increase from the inside to the outside of the gear. Axial misalignment of the two shafts which mount the coupling halves can be accommodated by placing the teeth of the two halves on the surfaces of cones having substantially equal apex angles and relieving the surfaces of the teeth in the region adjacent their ends.

7 Claims, 8 Drawing Figures

CURVED TOOTH GEAR COUPLING

SUMMARY OF THE INVENTION

The present invention relates to gear couplings. It is an object of the present invention to provide a gear coupling capable of transmitting high torques.

It is a further object to provide a gear coupling which, by virtue of the gear tooth configuration, is self-centering.

It is an additional object of the present invention to provide a gear coupling which will tolerate a certain amount of axial misalignment between the two coupling halves without substantially impairing drive capability.

It is yet another object of the present invention to provide a gear coupling which can be utilized as a clutch which will separate under a predetermined load.

It is a further object of the present invention to provide a gear coupling which can be used as a precision indexing drive.

It is still a further object to provide a curved tooth form which can be machined on a hubbed gear blank.

These and other objects of the invention are achieved by a gear coupling having a right and a left-hand gear member, each coupling half having curved teeth and the left hand gear being a mirror image of the right hand gear. This means for any point along both tooth faces, the pitch angle and spiral angle is equal to that of the corresponding engaging point on the mating gear tooth face.

The curvature of the teeth make the coupling self-centering. Further, the increased surface area of the curved teeth, better distributes the load and enables a higher degree of torque loading. The teeth may vary in thickness between their innermost and outermost points on the gear. These features can be applied equally well to face gears and mating conical gears. The mating conical gears will even tolerate non-alignment of the input and output shalfts. By proper selection of a biasing spring, the coupling can be utilized as a clutch which will automatically disengage upon reaching a predetermined torque load.

The coupling halves are generated by a pair of cutting tools such as hobs, for example, each having a constant lead and equal pressure angles on both sides of the cutting teeth. Because of this manner of formation, the tooth forms can be generated on gear blanks which have hubs.

These and other features, objects and advantages of the present invention will be better understood after a review of the following detailed description when read in conjunction with the accompanying drawings.

DETAILED DESCRIPTION OF THE INVENTION

Figure 1A:
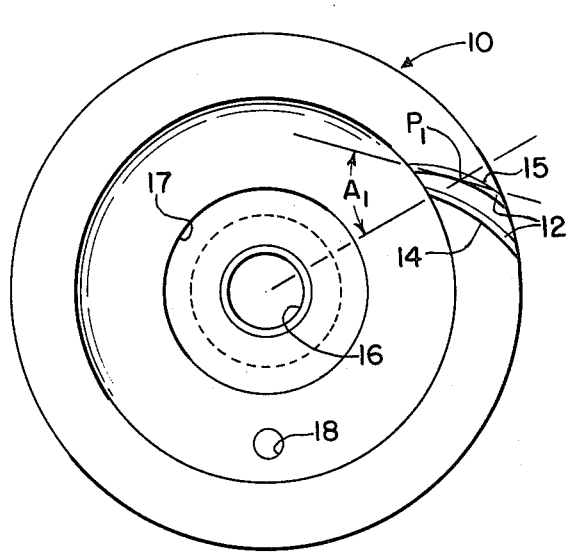
FIG. 1A is a plan view of the left-hand gear of the coupling.
Figure 1B:
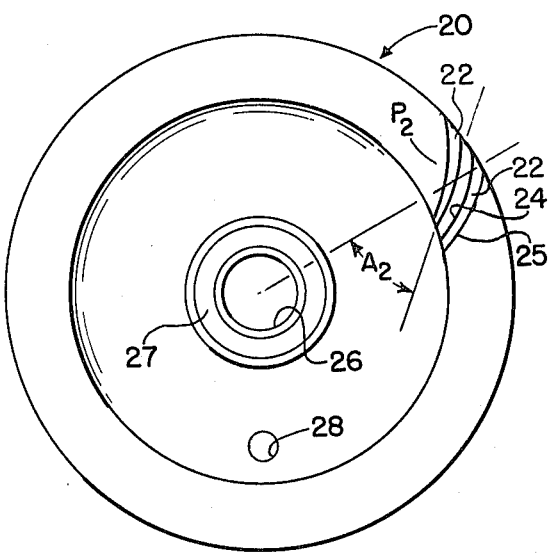
FIG. 1B is a plan view of the right-hand gear of the coupling.
Figure 2:
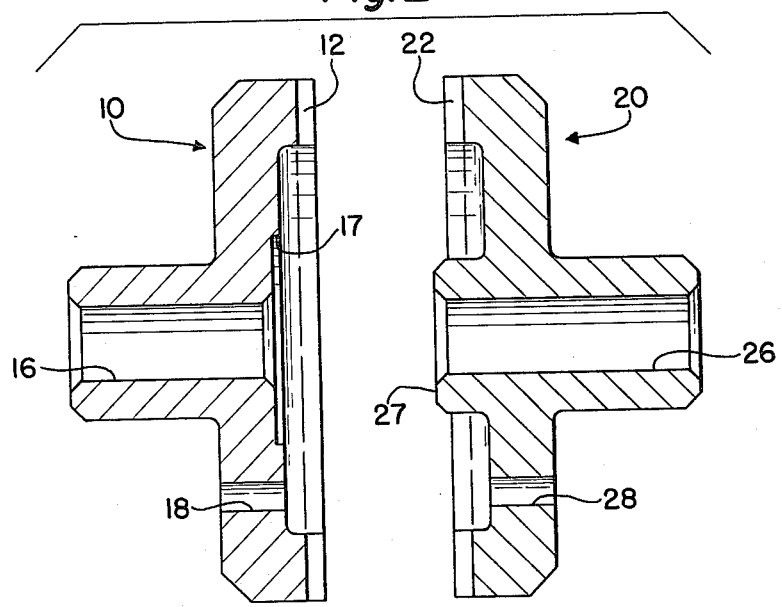
FIG. 2 is a cross-sectional view of the coupling showing the two halves disengaged.
Figure 3:
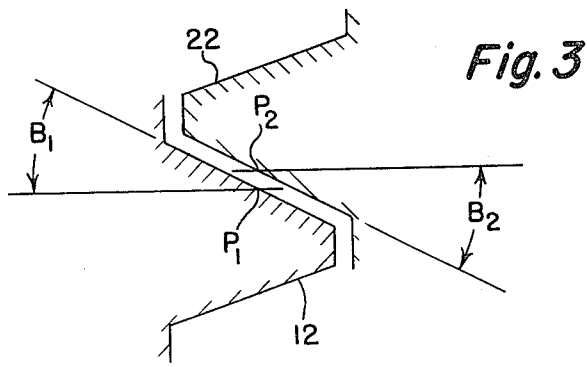
FIG. 3 is an enlarged cross-sectional view of a single pair of teeth, taken perpendicular to their center lines with the members of the pair being shown slightly spaced from one another for clarity.

The gear coupling halves are depicted generally in FIGS. 1A and 1B as 10 and 20 respectively. A similar curved tooth face gear which is used with a tapered pinion is shown in U.S. Pat. No. 2,696,125 which disclosure is hereby incorporated by reference. The left-hand gear 10 has curved teeth 12 extending from the outer periphery inwardly. The curved teeth have two lateral faces, a concave (or inward) face 14 and a convex (or outward) face 15. As best seen in FIG. 2, gear 10 has a longitudinally-extending, shaft-receiving aperture 16 and an enlarged recess 17. A second small aperture 18 serves as a means to positively index the gear 10 during machining. For any contact point 'p$_1$' on either of the faces 14 and 15, there is an associated spiral angle $A_1$ and an associated pressure angle $B_1$ (FIG. 3).

Gear 20 shown in FIG. 1B has a generated tooth pattern which is a mirror image of that of gear 10. That is to say, for any contact point 'p$_2$' along the concave faces 24 of the teeth 22 (or convex faces 25), the spiral angle $A_2$ and pressure angle $B_2$ are equal to the angles $A_1$ and $B_1$ for the associated contact point 'p$_1$' on gear 10.

Gear 20 is depicted as having a central hub 27. While this is not an essential feature of the present invention, one of the advantages of the method of making the gears of this coupling is that a hub can be added. The left and right-hand gears are manufactured by left and right-hand hobs (not shown) which have equal lead and pressure angles. Since no portion of the cutting hob sweeps the center region of the gear, as in some gear cutting methods, this area need not be left open. As can be seen in FIGS. 1A and 1B, the teeth 12 and 22 generally increase in width from the inside to the outside of the gear. This is also a result of the above-noted gear cutting method. It is preferred, though not essential, that the pressure angles and spiral angles be substantially the same for the concave and convex sides of each tooth.

In use, the two halves of the coupling are mounted on separate shafts (not shown). The curved teeth 12 and 22 make the two coupling halves self-aligning, or self-centering. In addition, the increased surface area due to the curvature results in a better load distribution and, accordingly a higher torque-load capacity. The coupling may be used as a precision indexing device by providing a high number of teeth per gear (e.g., 360) and rotating the coupling one tooth, disengaging, returning, and reengaging the input gear, and so forth. Or alternatively, the gear coupling can be used as a self clutching coupling by utilizing a spring having a predetermined biasing force so that the coupling halves will disengage under a predetermined torque loading.

Figure 4A:
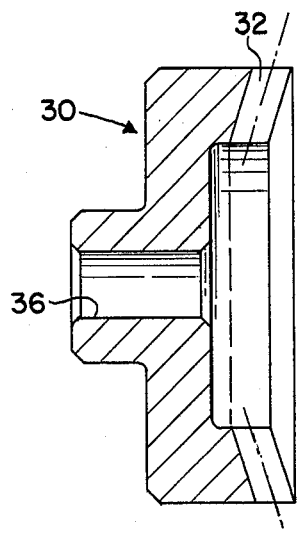
FIG. 4A is a cross-sectional view of the left-hand gear of an alternate form of the invention.
Figure 4B:
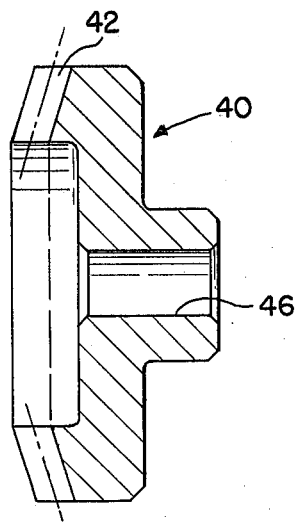
FIG. 4B is a cross-sectional view of the right-hand gear corresponding to the embodiment shown in FIG. 4A.
Figure 5A:
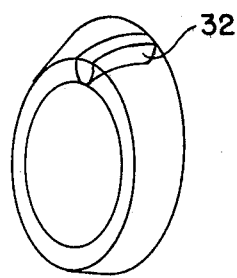
FIG. 5A is an isometric schematic of the tooth configuration of the left-hand gear shown in FIG. 4A.
Figure 5B:
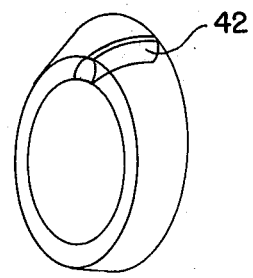
FIG. 5B is an isometric schematic of the tooth configuration of the right-hand gear shown in FIG. 4B.

A second embodiment is shown in FIGS. 4 and 5. In this embodiment, rather than having the teeth lying generally in a common plane which is perpendicular to the axis of the gear, as was the case with the first embodiment, the teeth generally define the surface of a cone. As shown in FIGS. 4A, 4B, 5A and 5B, the teeth 32 of left-hand gear 30 form internal teeth lying on the cone's surface while teeth 42 of right-hand gear 40 lie on the external surface of a cone. The teeth are curved as in the previous embodiment and the apex angle of the two cones are generally equal. It will be appreciated that the apex angles have been grossly exaggerated in FIGS. 5A and 5B for simplicity of illustration. This embodiment will tolerate a greater degree of shaft misalignment due to the conical configuration of the tooth pattern. It may be desirable to relieve the teeth in the end regions to accommodate greater shaft misalignment if the particular application warrants it.

It will be appreciated by the artisan that various changes, modifications and alterations to the above disclosed embodiments would be possible. For example, the tooth cross-section shown in FIG. 3 might be varied, as for example, by rounding the corners to facilitate engagement and disengagement of the coupling halves. Accordingly, it is intended that all such changes, modifications and alterations as come within the scope of the appended claims be included in the present invention.

I claim:

1. A gear coupling comprising two halves, a right-hand gear and a left-hand gear which mates therewith, each member of the gear coupling having a plurality of curved teeth enabling the coupling halves to be self-centering, each of the teeth of the two coupling halves having an inner concave and an outer convex tooth face and being so configured that any contact point along both the inner concave and the outer convex faces has a spiral angle and pressure angle which is equal to that of its corresponding contact point along the respective outer convex and inner concave faces of the other coupling half, wherein said teeth of said right-hand gear are formed by a right-hand hob that has a constant lead and equal pressure angles on both sides of the cutting teeth of said right-hand hob and said teeth of said left-hand gear are formed by a left-hand hob that has constant lead and equal pressure angles on both sides of the cutting teeth of said left-hand hob.

2. The gear coupling of claim 1 wherein the width of each curved tooth varies from the innermost tooth portion to the outermost tooth portion.

3. The gear coupling of claim 2 wherein the width of each tooth increases from said innermost to said outmost portion.

4. The gear coupling of claim 1 wherein each coupling half has a pitch plane which is perpendicular to the axis of the gear.

5. The gear coupling of claim 1 wherein the pitch lines of the teeth of the respective coupling halves define cones.

6. The gear coupling of claim 5 wherein the apex angle of the cone for the one coupling half is generally equal to the apex angle of the other coupling half.

7. The gear coupling of claim 1 wherein the spiral and pressure angles are generally equal for the inner and outer face of each tooth.

* * * * *